Dec. 10, 1946.　　　O. H. SCHADE　　　2,412,291
ELECTRON DISCHARGE DEVICE
Filed May 30, 1942　　　3 Sheets-Sheet 1

Inventor
Otto H. Schade
By
C. D. Tuska
Attorney

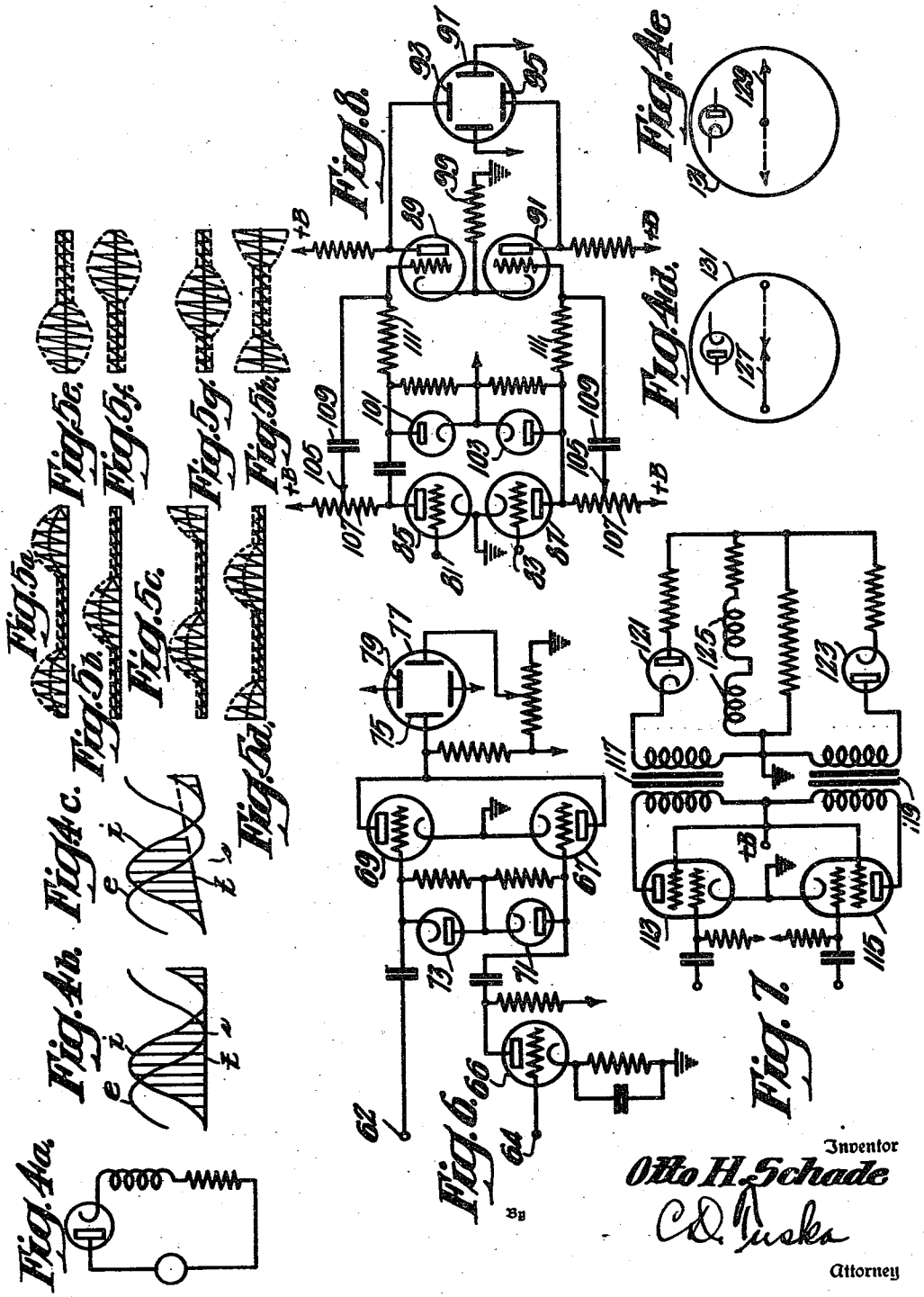

Dec. 10, 1946.  O. H. SCHADE  2,412,291
ELECTRON DISCHARGE DEVICE
Filed May 30, 1942  3 Sheets-Sheet 3
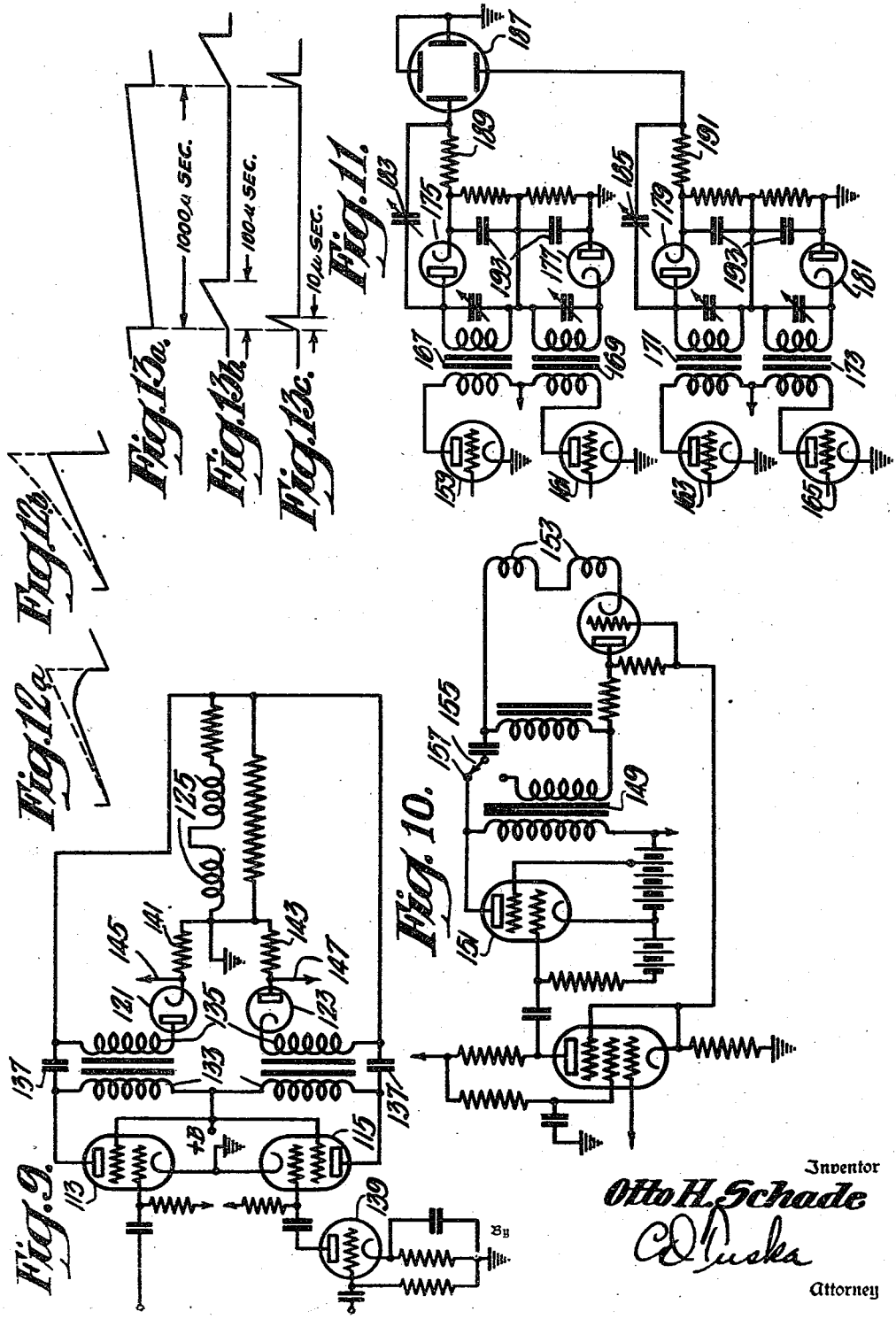
Inventor
Otto H. Schade
Attorney Patented Dec. 10, 1946

2,412,291

UNITED STATES PATENT OFFICE 2,412,291

ELECTRON DISCHARGE DEVICE

Otto H. Schade, West Caldwell, N. J., assignor to Radio Corporation of America, a corporation of Delaware Application May 30, 1942, Serial No. 445,185

8 Claims. (Cl. 315—24)

This invention relates to deflection circuits for cathode ray indicating systems, and more particularly to circuits for producing linear radial traces on the fluorescent screen of a cathode ray tube. The words "radial trace" are used to refer to a trace having one of its ends at or near the center of the cathode ray tube screen, as distinguished from a "diametral trace," having its ends approximately equidistant from the center of the screen. In certain applications of cathode ray tubes, as in some types of radio distance and direction indicators, it is desirable to produce a radial trace which is rotatable about its inner end to correspond in direction with the angular position of a remote shaft, which, for example, may be connected to a rotatable directional antenna. The problem is complicated by the fact that the remote control shaft need not necessarily rotate at a constant speed, but may be stopped and reversed.

The conventional deflection means in a cathode ray tube is a stationary four-pole system consisting of four rectangularly disposed deflection plates for electrostatic deflection or two pairs of deflection coils arranged at right angles for magnetic deflection. According to this invention, the line of deflection of the beam in a cathode ray tube is rotated about one of its ends at the axis of the tube by impressing upon each of the beam deflecting means a sawtooth wave or other sweep signal of sinusoidally varying amplitude. The sinusoidal variations on one pair of the beam deflecting means differ in phase by 90° from the variations on the other pair.

Figure 1:
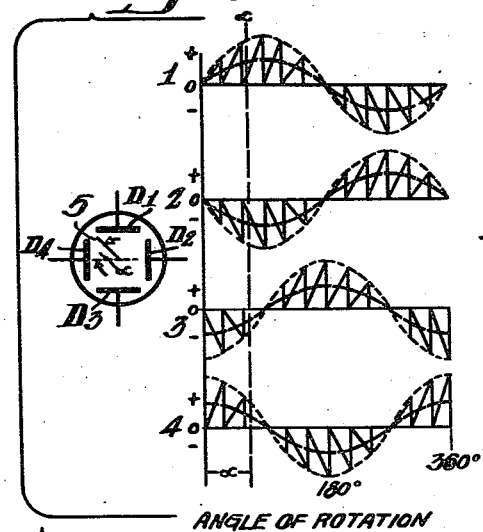
Figure 2:
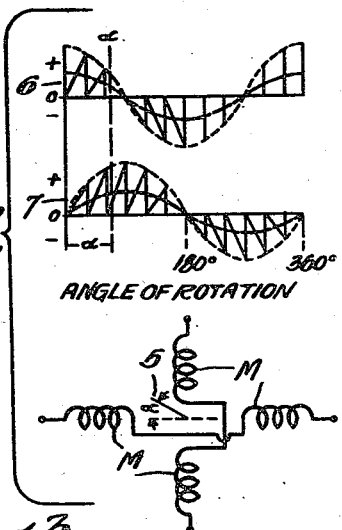
Figure 3:
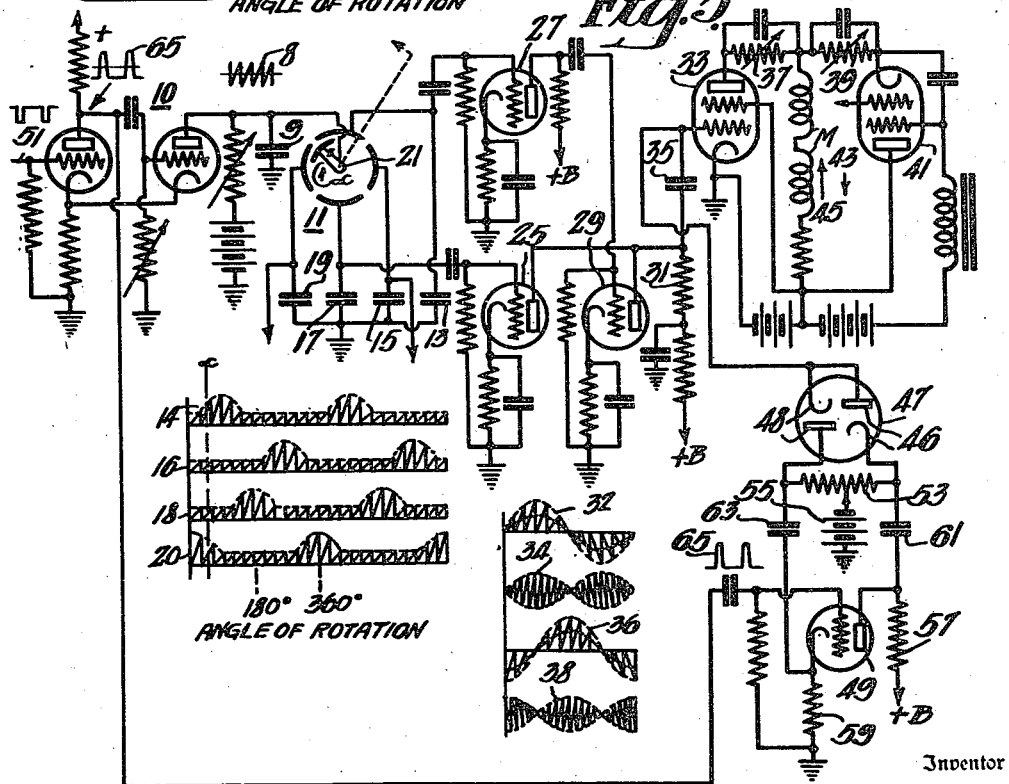

The principal object of this invention is to provide an improved method of and means for deflecting a cathode ray beam. Another object of this invention is to provide improved means for generating signals for radial deflection of a cathode ray beam, said signals being controlled in amplitude in accordance with the angular position of the rotor of a remote control unit so as to produce a synchronous angular displacement of the radial cathode ray beam trace. A further object is to provide an improved system of the described type in which the length of the radial trace is constant throughout a 360° rotation independent of the speed of rotation. Other objects, features and advantages of this invention will be apparent to those skilled in the art upon consideration of the following specification with reference to the accompanying drawings, in which Figs. 1 and 2 are graphs representing the wave forms of voltages or currents required in electrostatic or magnetic deflection systems respectively to produce rotation of a unidirectional deflecting field; Fig. 3 is a circuit diagram showing one form of this invention; Figs. 4a, 4b, 4c, 4d, 4e and Figs. 5a, 5b, 5c, 5d, 5e, 5f, 5g and 5h are graphs representing wave forms of voltages produced in operation of the device of the invention; Figs. 6, 7, 8, 9 and 10 are schematic diagrams of modified deflection voltage amplifier and D.-C. insertion circuits; Fig. 11 is a diagram of a circuit for the use of modulated sine wave, instead of sawtooth, deflecting voltages; Figs. 12a and 12b are graphs of wave forms illustrating sawtooth wave distortion and its compensation; and Figs. 13a, 13b and 13c are graphs of three sawtooth waves having the same amplitude and repetition time but different slopes.

Referring to Fig. 1, the voltage characteristics 1, 2, 3, 4 required at each of the plates of an electrostatic deflection system to produce radial deflection are applied to the deflecting plates $D_1$, $D_2$, $D_3$ and $D_4$. Similarly, as shown in Fig. 2, the currents 6 and 7 may be supplied to the deflecting coils M in a magnetic deflection system. For a constant angular velocity, the modulation envelope is sinusoidal and the average component is zero. For a stationary trace 5 at any position, such as indicated by the angle $\alpha$, the average component has a finite value and a polarity depending on the value of $\alpha$, as shown by the dashed curves.

For any radial trace other than one rotating at a constant velocity the average component is not zero. Therefore, conductive coupling or its equivalent between signal generating and deflecting systems is essential. A system for radial deflection and variable angular velocities including zero value is thus substantially different in operation and organization from a system with constant velocity of field rotation and diametral deflection. A diametral system termed "a radial scanning system" in the De Forest Patent 2,241,809, makes no provision for transmission of average values other than zero. A circuit for generating and modulating sawtooth voltages as shown in Fig. 1 is illustrated in detail in Fig. 3. A multivibrator 10 has its output connected across a capacitor 9. This circuit is described and claimed in U. S. Patent No. 2,157,434 to James L. Potter. A capacitive voltage divider 11 is also connected across the capacitor 9 and comprises four fixed capacitors 13, 15, 17 and 19 and a variable capacitor 21. The rotor of the capacitor 21 is mechanically connected to the shaft (not shown) with which the radial trace is to be synchronized. The plates of the capacitor 21 are shaped so that the voltages across the fixed capacitors have envelopes which are half wave sinusoidal functions of the angular position α of the rotor, plus a residual component due to the minimum capacitance between the rotor and stator plates. The voltages 14, 16, 18 and 20 on the fixed capacitors 13, 15, 17 and 19 respectively of the voltage divider as functions of the position of the rotor of the capacitor 21 are illustrated by the correspondingly numbered curves in Fig. 3. The capacitor 17 is coupled to the input of an amplifier tube 25, and the capacitor 13, connected to the opposite stator plate of the capacitor 21, is coupled through a polarity reversing tube 27 to the input of an amplifier tube 29. The tubes 25 and 29 have a common plate circuit 31. The capacitors 15 and 19, which are connected to the other pair of oppositely disposed stator plates of the capacitor 21, are coupled similarly to a pair of amplifiers with a common load circuit. These circuits are omitted from the drawing for clarity.

The plate circuit 31 is coupled to the grid of a power amplifier tube 33 through a capacitor 35. The plate circuit of the tube 33 includes one pair of the deflecting coils M of a cathode ray tube. Resistors 37 and 39 and a screen grid tube 41 are also included in the plate circuit of the tube 33 and are connected to provide a constant current 43 through the deflecting coils M to cancel the zero-signal component 45 of the plate current of the tube 33. An auxiliary circuit including tubes 47 and 49 is connected to the grid of the power tube 33 in order to restore the direct current component of the signal lost in the capacitively coupled amplifiers 25, 27 and 29.

The operation is as follows: The multivibrator 10 produces a sawtooth shaped voltage wave 8 on the capacitor 9. The sawtooth frequency is controlled by the circuit constants of the multivibrator and may be synchronized with a signal applied to the input 51. The voltage 8 is applied to the capacitive voltage divider 11, resulting voltages 14, 16, 18 and 20 on the corresponding capacitors. The voltage 18 is amplified by the tube 25, and the voltage 14, which has a sinusoidal envelope component 180° out of phase with that of the voltage 16, is reversed in polarity by the tube 27, and amplified by the tube 29. The two amplified voltages are combined in the common plate circuit 31, cancelling the residual components caused by the minimum capacitances of the capacitor 21 and adding alternately reversed half-sinusoids to produce a voltage wave 32. This is amplified by the power tube 33 to provide a similarly shaped current wave in the deflecting coils M. In the same manner, the voltages 16 and 20 across the capacitors 15 and 19 are amplified and combined to produce a current wave like the voltage 36 in a second pair of deflecting coils, which are spaced 90° around the axis of the cathode ray tube from the first pair.

Since the voltages 32 and 36 have sinusoidal envelopes 90° out of phase, they will produce the required rotating radial sweep, deflecting the cathode ray beam outward from the center at the sawtooth frequency and rotating the resultant radial trace about its inner end at the envelope frequency, which is the frequency of rotation of the variable capacitor 21. However, this is true only if the envelope frequency is high enough for the capacitively coupled amplifiers 25, 27 and 29 to pass it without attenuation. When the speed of rotation of the capacitor 21 is lower, the voltage across the load 31 assumes the form shown at 34, due to the fact that the average component, shown by the dashed line, is of too low a frequency to be transmitted. If the voltage 34 and the corresponding quadrature voltage 38 were applied to the power amplifier and deflecting circuit, each trace of the cathode ray would have its center at the center of the pattern, instead of starting at the center. As the capacitor 21 is rotated slowly, the trace would rotate about its center instead of around one of its ends.

The D.-C. insertion circuit, or "clamping" circuit operates to restore the lost average component of the modulated sawtooth wave. The grid of the power tube 33 is connected through a pair of diodes 46 and 48 and a tapped resistor 53 to a bias source 55. A tube 49 is provided with plate and cathode load resistors 57 and 59, respectively, coupled through capacitors 61 and 63, respectively, to the diodes 46 and 48, which are connected to conduct in opposite directions. The grid of the tube 49 is coupled to receive impulses 65 from the multivibrator 10 during the return period of the sawtooth wave. This signal results in a positive pulse at the cathode and a negative pulse at the plate of the tube 49, causing both diodes 46 and 48 to conduct, momentarily presenting a relatively low impedance path from the grid of the tube 33 to the resistor 53 and thence to the bias source 55 which is adjusted to provide the proper grid voltage for the tube 33 at the start of the sawtooth voltage. The tap on the resistor 53 is adjusted to form a balanced bridge circuit with the impedances of the diodes 46 and 48, preventing the pulses 65 from reaching the grid of the tube 33. During the pulse time of pulses 65, corresponding to the sawtooth return period, the coupling capacitor 35 is discharged rapidly to the potential existing at that time between D.-C. voltage 55 and the plate of the preceding stage. The capacitor 35 maintains this potential for one sawtooth period during which the diodes 46 and 48 are non-conducting and act as open circuits, and is then reset again in the same manner, thus causing all sawtooth cycles to begin with the same voltage, that of the source 55. The signal at the grid of the tube 33 is hence undistorted as compared with the voltage 32 although the amplifier coupling networks do not pass low or zero frequencies, but only the frequencies needed for transmission of the sawtooth wave 8. A further advantage in the use of a clamping circuit is the elimination of extraneous low frequency pickup voltages, such as 60 cycle hum which may occur in the grid circuits of the tubes 25 and 27.

For symmetrical electrostatic deflection circuits, four voltages are needed as shown in Fig. 1; the voltages 2 and 4 are obtained by inverting the phase of the voltages 1 and 3 respectively in a conventional phase inverter circuit. This may be done before the clamping, to allow capacitive coupling of the phase inverters. Each deflection plate of the cathode ray tube is then directly coupled to one power amplifier tube having a clamping circuit in its grid circuit.

The deflection circuits can be simplified by combining the halves of each sinusoidal modulation envelope after D.-C. restoration. The voltages appearing at the respective output terminals of a capacitive voltage divider connected to a sawtooth wave source as in Fig. 3 are illustrated in Figs. 5a, 5b, 5c and 5d. Upon passing through capacitively coupled amplifiers, the direct components of these voltages are lost, resulting in the waves shown in Figs. 5e, 5f, 5g and 5h, respectively. The sawtooth components are in phase in the waves 5e and 5f, which represent the two halves of one sinusoidally modulated deflection voltage, and in the waves 5g and 5h, which represent the other deflection voltage, modulated in quadrature phase with the first. Referring to Fig. 6, a circuit for one of the phases for a single plate of the electrostatic deflection system is shown. The voltages corresponding to one phase, for example those of Figs. 5e and 5f, are applied to the terminals 62 and 64, respectively. The polarity of the sawtooth component of the wave 5f is reversed by a phase inverter 66 and applied to an output tube 67, while the wave 5e is applied directly to an output tube 69. Diodes 71 and 73 are connected in the grid circuits of the tubes 67 and 69, and act as peak rectifiers, producing D.-C. voltages which are proportional to the average components of the sawtooth waves and are added to them, thus restoring the wave envelopes to the shapes shown in Figs. 5a and 5b. These are combined in the common plate circuit of the tubes 67 and 69, resulting in a voltage wave like that shown in Fig. 1a, which is applied directly to a deflection plate 75 of a cathode ray tube 77. The other deflection plate 79 is supplied with a voltage similarly derived from the waves 5g and 5h.

Fig. 8 shows a circuit for one of the two phase connections for a push-pull or symmetrical electrostatic deflection system. The half wave components, such as those shown in Figs. 5e and 5f, are applied to the terminals 81 and 83, which are connected to the grids of a pair of amplifier tubes 85 and 87, respectively. The plates of the tubes 85 and 87 are coupled to the grids of a pair of power amplifier tubes 89 and 91, respectively, whose plates are connected to one pair of deflecting plates 93 and 95 of a cathode ray tube 97. The power tubes 89 and 91 have a common cathode resistor 99, which is relatively high in resistance as compared to the reciprocal of the transconductance of the tubes 89 and 91 so as to produce phase inversion by cathode coupling. A pair of diodes 101 and 103 are connected as peak rectifiers in the grid circuits of the power tubes, and function like the diodes 71 and 73 in the circuit of Fig. 6. Since the diodes are not 100 percent efficient, they do not supply quite enough D.-C. voltage to restore the average value of the sawtooth waves, and the deflections of the beam in the tube 97 tend to start slightly off center. This is compensated by reducing the A.-C. components by the same percentage. A tap 105 on each of the load resistors 107 of the amplifiers 85 and 87 is coupled through a capacitor 109 to the power tube grid circuit. Resistors 111 are provided for isolating this circuit from the peak rectifiers 101 and 103, so that the A.-C. voltage drops on the resistors 111 will be subtracted from the A.-C. voltages across the rectifiers.

Circuits for magnetic deflection in which alternate half wave signals are combined after amplification and D.-C. restoration are shown in Fig. 7. Referring to Fig. 7, a pair of power amplifier tubes 113 and 115 are arranged to have voltage waves like those shown in Figs. 5e and 5f applied to their respective control grids, and their plate circuits include the primaries of a pair of transformers 117 and 119, respectively. The transformer secondaries are connected through diodes 121 and 123 to one pair of deflection coils 125, so that current will flow in only one direction in one branch circuit and only in the opposite direction in the other. The deflection coil circuit has a high inductive reactance and low power factor. This condition is secured by making the reactances of the transformers 117 and 119 large in comparison to the total resistance in the circuit, including the diode resistance. Because of this reactance, the diodes become conducting at the start of the sawtooth cycle, maintaining a closed circuit for substantially the entire cycle. This action is similar to that of a half wave rectifier circuit of low resistance connected to a sine wave generator as illustrated in Fig. 4a. Figs. 4b and 4c show graphic constructions of the transient operation of such a circuit under high and low power factor conditions respectively. The wave forms e and i would be obtained if the diode were short-circuited. The transient voltages t arising when the diode starts to conduct (when $e=0$) are added graphically. When $t=e$, at the time s, the diode stops conducting. When the power factor is zero, the conduction time is one full cycle, and when the power factor is unity, the conduction time is one-half cycle. The current in a low power factor circuit with a diode is hence unidirectional, but of substantially the same wave form as without the diode. The D.-C. polarity depends on the polarity of the diode. This action is used in the circuit of Fig. 7 to restore the D.-C. component of the unidirectional deflection current, producing deflection positions shown in Figs. 4d and 4e by the traces 127 and 129 with respect to the center of a cathode ray tube 131.

A choke coupled, so called direct drive circuit is shown in Fig. 9. Its operation is similar to that of the circuit of Fig. 7. A pair of power tubes 113 and 115 are coupled to the deflecting coils 125 by means of chokes 133 and 135 and capacitors 137. The tubes 113 and 115 are operated class A, and the input to the tube 115 is reversed in phase by an inverter 139.

Practical sawtooth deflection circuits, particularly when operated at low frequencies, may cause distortion of the current wave form because of insufficient reactance, resulting in a rapidly decaying wave form as illustrated in Fig. 12a. This is corrected by distorting the driving voltage by an equivalent amount as shown in Fig. 12b. This correction may be obtained automatically by the use of inverse feedback. The voltage drops on resistors 141 and 143 are taken off on leads 145 and 147 and added to the sawtooth signal in the proper polarities in earlier stages of the amplifier system.

The circuit shown in Fig. 10 is arranged to permit operation with different ratios of current transformation for efficient operation with widely different sawtooth slopes as shown in Figs. 13a, 13b and 13c. The high slope, short duration sawtooth 13c limits the permissible inductance of the deflection coils 153 to a relatively low value, because the inductive voltage $$L\frac{di}{dt}$$

is limited by the available plate supply voltage, thus requiring a high current for a given deflection. The average plate current and power dissipation of the tube 151 is, however, moderate because of the long zero current time interval between deflection time repetitions. For this signal no step down is used, and a switch 155 is operated to contact point 157, connecting the deflection circuit to the primary of the transformer 149. For slower deflection rates, the inductive voltage $$L\frac{di}{dt}$$

has a lower value, permitting the use of a step down ratio and requiring thus a lower peak plate current from the power tube for a given deflection. In this manner, the total voltage drop reflected into the plate circuit of the power tube can be given the same value for different sawtooth slopes, with the power tube operating at maximum efficiency.

Thus far the invention has been described only with reference to the use of modulated sawtooth deflecting voltages. However, it is feasible to use modulated voltages of other shapes, for example, sinusoidal. The radial velocity of the trace will vary with its radius, instead of being constant, as with a sawtooth signal. A circuit adapted for use with modulated sinusoidal deflection signals is shown in Fig. 11. A source of sine wave voltage, not shown, is connected across a capacitive voltage divider like the voltage divider 11 in Fig. 3. The four output terminals are connected to the grids of amplifier tubes 159, 161, 163 and 165, respectively. The plate circuits of these tubes include the primaries of step-up transformers 167, 169, 171 and 173, which are tuned to resonate at the oscillator frequency. The transformer secondaries are connected to rectifiers 175, 177, 179 and 181 which produce the modulation envelope voltages on their respective loads, which are serially connected for each phase as shown to obtain the complete summation waves for rotation of the cathode ray beam. Radial modulation voltages are obtained directly from the transformers, which are connected in pairs with primaries in opposite polarities and with secondaries in the same polarities and in series. The radial deflection voltages are coupled over capacitors 183 and 185 into the deflection circuits of the tube 187. Isolating impedances 189 and 191 prevent these voltages from being short circuited by the rectifier filter capacitors 193. Variation of the capacitors 183 and 185 allows variation of the radial deflection amplitude.

Thus the invention has been described as a device for causing a radial deflection of the beam of a cathode ray tube in a direction corresponding to the angular position of a shaft, the direction of said deflection being unique for each position of the shaft even at low or zero speeds of rotation. The required deflecting voltages are derived by modulating the output of a sawtooth or a sine wave generator with a capacitive voltage divider to produce component waves which are combined, amplified, and applied to the deflecting circuits. Direct current components which are lost in the amplifier and combining circuits are restored by a clamping or D.-C. insertion circuit.

I claim as my invention:

1. A deflection system for cathode ray tubes including a deflection voltage generator and a plurality of variable voltage dividers connected across the output circuit of said generator, a shaft for driving said voltage dividers, said voltage dividers being so constructed and arranged that the proportions of the output voltage of said generator appearing across the output terminals of said voltage dividers are uniquely related to the angular position of said shaft, means for amplifying said latter voltages including networks which discriminate against the low frequency and direct current components of said voltages, and means for compensating said discrimination including rectifiers arranged to derive unidirectional voltages proportional to the average components of said disproportionately amplified voltages and to add said unidirectional voltages to the respective distorted voltages from which they are derived.

2. A deflection system for cathode ray tubes including a deflection voltage generator and a plurality of variable voltage dividers connected across the output circuit of said generator, a shaft connected to said voltage dividers, said voltage dividers being so constructed and arranged that the proportions of the output voltage appearing across the output terminals of said voltage dividers are uniquely related to the angular position of said shaft, means for combining said voltages appearing at the output terminals of one pair of said voltage dividers to produce a voltage synchronous with and similar in wave shape to that produced by said deflection voltage generator but having an amplitude proportional to the cosine of the angle of position of said shaft, and means for combining the voltages appearing at the output terminals of a second pair of said voltage dividers to produce a second voltage synchronous with and similar in wave shape to that produced by said deflection voltage generator but having an amplitude proportional to the sine of the angle of position of said control shaft, means for amplifying said cosine proportional and sine proportional voltages including networks which discriminate against the low frequency and direct current components of said voltages, means for compensating said discrimination including switching devices arranged to cause each cycle of said disproportionately amplified voltages to form a predetermined voltage level, and means for applying said voltages to respective rectangularly related deflection elements of a cathode ray tube.

3. A deflection system for cathode ray tubes including a deflection voltage generator and a plurality of voltage dividers connected across the output circuit of said generator, each of said voltage dividers comprising a variable capacitor connected in series with a fixed capacitor, a shaft connected to said variable capacitors, said variable capacitors being so constructed and arranged that the proportions of the output voltage of said generator appearing across the output terminals of said voltage dividers are uniquely related to the angular position of said shaft, means for amplifying said voltages including coupling networks which discriminate against the low frequency and direct current components of said voltages, and means for compensating said discrimination including rectifiers arranged to derive unidirectional voltages proportional to the average components of said disproportionately amplified voltages and to add said unidirectional voltages to the respective distorted voltages from which they are derived.

4. A deflection system for cathode ray tubes including a deflection voltage generator and a plurality of voltage dividers connected across the output circuit of said generator, each of said voltage dividers comprising a variable capacitor connected in series with a fixed capacitor, a shaft connected to said variable capacitors, said variable capacitors being so constructed and arranged that the proportions of the output voltage of said generator appearing across the output terminals of said voltage dividers are uniquely related to the angular position of said shaft, means for amplifying said voltages including coupling networks which discriminate against the low frequency and direct current components of said voltages, means for compensating said discrimination including rectifiers arranged to derive unidirectional voltages proportional to the average components of said disproportionately amplified voltages and to add said unidirectional voltages to the respective distorted voltages from which they are derived, and means for compensating the losses in said rectifiers by providing corresponding attenuation of said distorted voltages.

5. The invention as set forth in claim 1 wherein said last named means comprises diode rectifiers provided with low power factor load circuits.

6. A deflection system for cathode ray tubes including a deflection voltage generator and a plurality of variable voltage dividers connected across the output circuit of said generator, a shaft connected to said voltage dividers, said voltage dividers being so constructed and arranged that the proportions of the output voltage of said generator appearing across the output terminals of said voltage dividers are uniquely related to the angular position of said shaft, means for amplifying said latter voltages including networks which discriminate against the low frequency and direct current components of said voltages, means for compensating said discrimination including rectifiers arranged to derive unidirectional voltages proportional to the average components of said disproportionately amplified voltages and to add said unidirectional voltages to the respective distorted voltages from which they are derived, and means for combining said amplified waves to produce voltage waves synchronous with and similar in shape to that produced by said deflection voltage generator but having amplitudes proportional respectively to the cosine and to the sine of the angle of position of said control shaft, and means for applying said resultant voltages to corresponding deflection circuits of the rectangularly related deflection elements of a cathode ray tube.

7. The invention as set forth in claim 1 wherein said deflection voltage generator produces an amplitude of substantially sinusoidal wave form.

8. The invention as set forth in claim 1 wherein said amplifier means includes resonant circuits tuned to the repetition frequency of said deflection voltage generator.

OTTO H. SCHADE.